Figure 5:
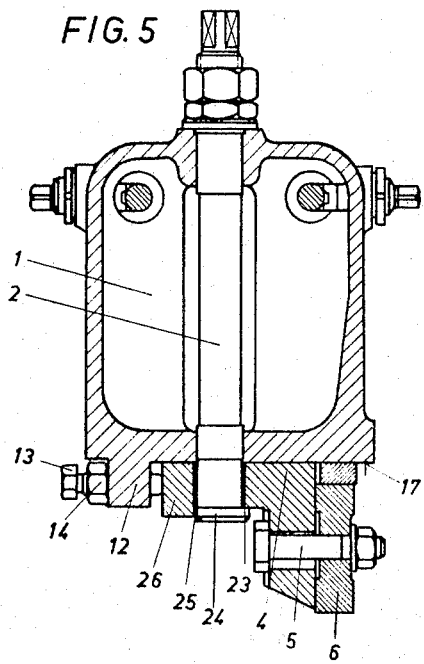

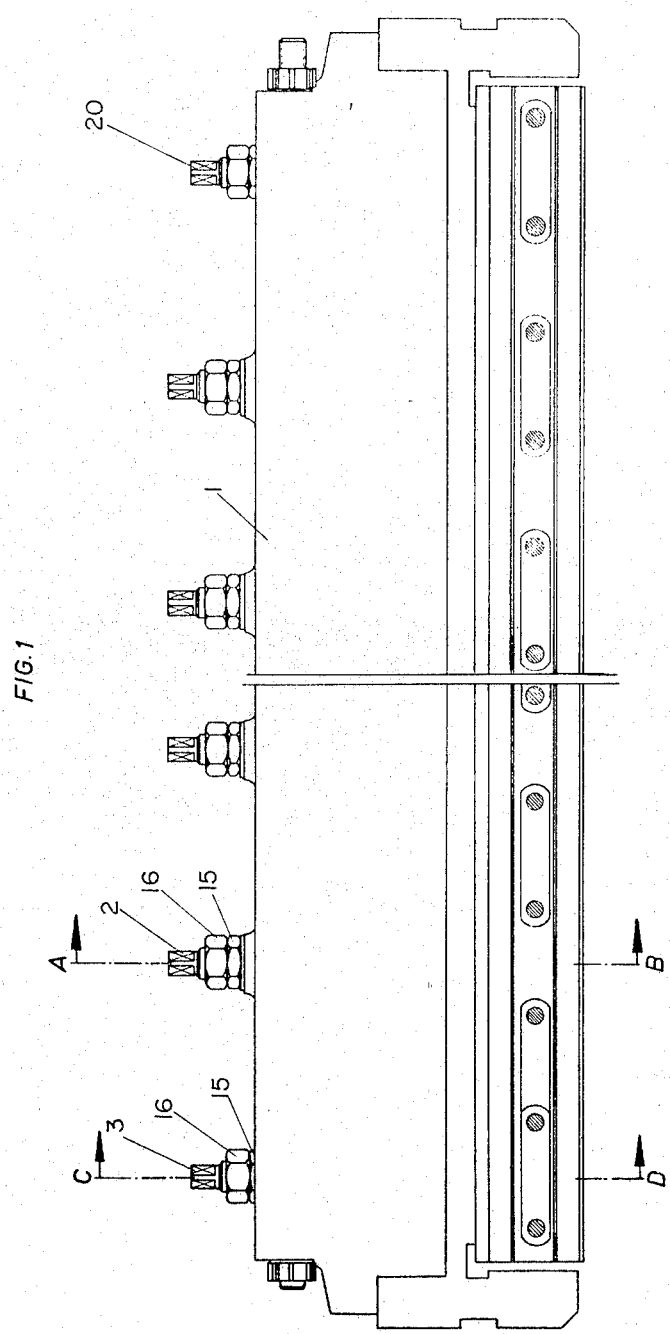

INVENTORS
ERNST BROMBACH &
HORST GANSEUER
BY
*Henry C. Westen*
THEIR ATTORNEY

United States Patent Office 3,289,517
Patented Dec. 6, 1966

3,289,517
ADJUSTING DEVICE FOR SHEAR KNIVES
Ernst Brombach, Dahlbruch, Kreis Siegen, and Horst Ganseuer, Eichen, Kreis Siegen, Germany, assignors to Siegner Maschinenbau G.m.b.H., a corporation of Germany
Filed Feb. 2, 1965, Ser. No. 429,848
Claims priority, application Germany, Feb. 5, 1966, S 89,383
4 Claims. (Cl. 83—640)

This invention relates to an adjusting device for the upper and/or lower blade of shears for the cutting of sheets or striplike material, such as guillotine shears, pendulum shears, cropping shears or dividing shears, in which in order to carry out the cut, two knives are brought into position on top of one another with the cutting plane. This invention is addressed to the problem of simplifying the setting required during readjustment or exchange of the knives and to shortening the time for the knife change as much as possible. At the same time the adjusting device in this connection should be easily accessible, assembled in a simple manner and procurable at a minimum expenditure.

Adjusting devices are already known, essentially for the adjustment of the lower knife, because there the constructive characteristics present less difficulties to the installation of an adjusting device. For that purpose, for example, it has been suggested to perform the adjusting by means of multistage keys or wedges arranged in pairs, which are provided adjustably through set-screws beneath the lower knife in the cutter table. Adjustable upper knife holders have also been proposed, in which the upper blade is screwed tightly to a bearing surface of the upper blade beam resting vertically on the cutting plane. In addition, adjustment devices are provided so that the entire upper blade beam is adjustable in special guides of the shearing housings or frames. The known adjusting devices turned out to be relatively expensive, and aside from constructive dispositions, it took too long to adjust or change the blades, resulting in an undesirable work stoppage.

According to the present invention an adjusting mechanism is provided that can be set up and serviced in a simple manner. In this connection, to achieve short adjusting and blade-changing times, the blades are mounted on a blade carrier so as to be adjustably connected with the blade beam in the direction toward the cutting plane in which eccentric screws are provided whose shank is guided in the blade beam and whose eccentric atachments engage in bores of the knife carrier. In certain cases two eccentric screws are arranged in the end-zone of the knife holders in combination with inter-spaced bolts, thereby after loosening the bolts the knife holder will be carried only by the two eccentric screws so that the adjustment of the knife can be performed sensitively and reproducibly.

A further advantage is gained by employing the eccentric screws as holding screws and by developing as an oblong hole at least one of the bores of the knife carrier encompassing the attachment of the eccentric screws.

The knife carrier or blade holder may advantageously include a limiting strip arranged outside the zone of the eccentric screws, in which the heads of the holding bolts have portions that engage the limiting strip.

A still further advantage of the present invention has reference to providing on the knife beams an adjustable pressure screw engageable against the knife holder in the direction of the cutting plane.

Figure 2:
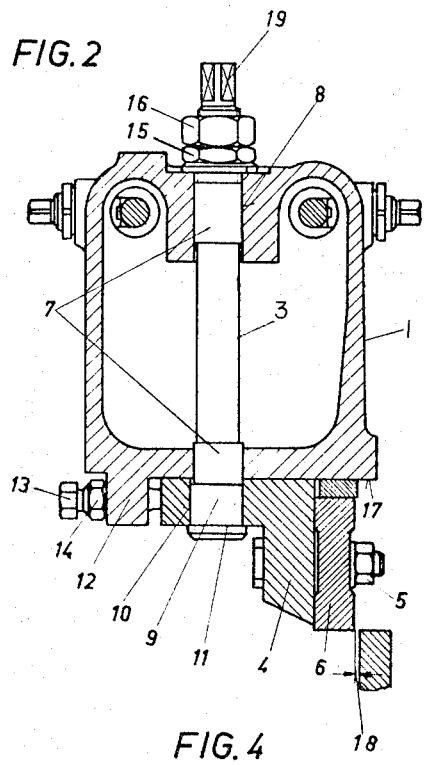
Figure 3:
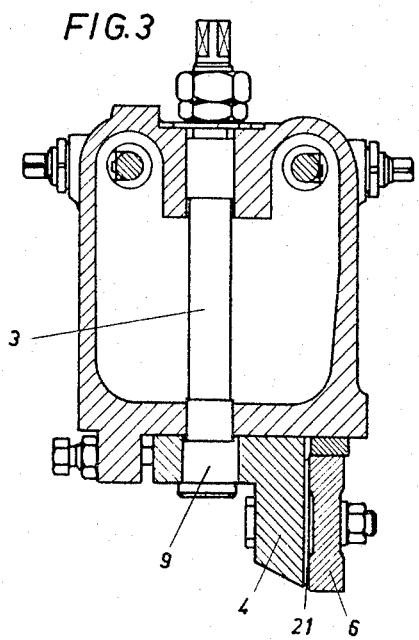
Figure 4:
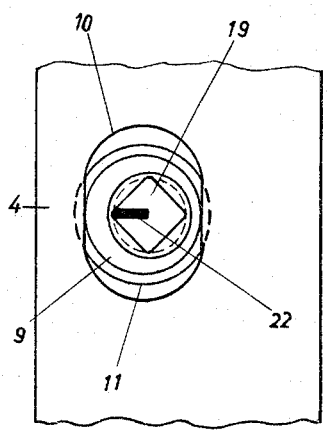

These features and advantages will be more fully discussed in the following description of the preferred embodiment of the present invention and the attached drawings of which:

FIGURE 1 is an elevational view of the upper knife beam of a pendulum shear in which the blade holder is fastened by means of bolts and eccentric screws;
FIGURE 2 is a sectional view of FIGURE 1 taken along the plane of lines C–D thereof;
FIGURE 3 is a sectional view corresponding to FIGURE 2, in which between the knife holder and the knife a shim (or plate) has been arranged for further compensation of the knife wear;
FIGURE 4 is a top view of the face of the square head of one of the eccentric screws, and wherein there is indicated the position of its eccentricity; and
FIGURE 5 is a sectional view of FIGURE 1 taken along the plane of lines A–B thereof through one of the assembly bolts.

Referring to FIGURE 1 there is shown an upper knife beam 1 which, at its lower side, fastened by a number of assembly bolts 2 and two eccentric screws 3 and 20, carries a knife holder 4 shown in FIGURES 2, 3 and 5. A shear knife 6 is rigidly connected with the vertical leg of the knife holder 4 through the knife screws 5.

The connection of the upper knife beam with knife holder and knife is shown in detail in FIGURE 2. The shank of the eccentric screws 3 and 20 has two central guide surfaces 7 that are guided in corresponding cutouts or recesses 8 of the upper knife beam 1. The eccentric attachment 9 of the eccentric screw 3 is encompassed by a bore 10 of the knife holder 4, the head 11 overlapping the edge of said bore. In order to brace the knife holder 4 against the shearing forces occurring during the cutting and for corresponding relief of the bolts and eccentric screws, adjusting screws 13 are provided in a plate 12 provided on the upper knife beam 1, which are set firmly against the rear side of the knife holder 4 and secured in their position by the nuts 14. The plate 12 as represented in the embodiment can be solid with the upper knife beam or securely connected thereto; on the other hand, the plate can be changeably mounted on the upper knife beam.

To adjust the upper knife the counternuts 16 and nuts 15 of all bolts 2 and eccentric screws 3 and 20 are loosened enough, so that the knife holder 4 on the base 17 of the upper knife beam 1 can be shifted. In FIGURE 2 the eccentric screw 3 is shown in its normal position in which the eccentric attachment 9 is away from the shear knife. This position forms the starting position for new shear knives 6 true to size. To diminish or readjust the cuting gap 18 for wear compensation, the eccentric screw 3, by means of a tool engaging its square head 19 is displaced far enough, so that the twisted eccentric attachment 9 in the bore 10 shifts the knife holder forward by the desired value. After setting the desired cutting gap 18, the nuts 15 and the counternuts 16 are so tightened that the knife holder is securely connected with the upper knife beam. To absorb the shearing forces, the screws 13 are set firmly against the rear side of the knife holder 4 and secured by means of the counternuts 14.

The two eccentric screws 3 and 20 in their bores 8 of the upper knife beam 1 are freely turnable by any desired angles. In the embodiment the bore 10 of the knife holder 4 for the eccentric attachment 9 of the eccentric screw 3 is executed round and adapted to the diameter of the eccentric attachment. The eccentric screw 20 arranged at the other end of the upper knife beam 1 engages with its eccentric attachment in a bore developed as an oblong hole of the knife carrier, so that the changes in the spacing of the eccentric attachments occurring with the displacement of the eccentric screws are compensated by a longitudinal shift inside the oblong (or slot) hole. It is also possible to provide for oblong holes in both cases and the number of eccentric screws intended for adjustment is not limited to two; the arrangement of a greater number of eccentric screws makes possible the selected adjustment also of longitudinal sections of the knife, however, the adjustment of a greater number of eccentric screws becomes more difficult through the fact that the displacement must occur jointly. With the use of only two eccentric screws, as shown in the embodiment, the adjustment of both screws can be done at will one after another or also simultaneously.

Illustrated in FIGURE 3 is an eccentric screw 3 in its extreme front position in which the eccentric attachment is turned toward the knife 6. To increase the adjusting range, a knife shim or plate 21 is inserted between the knife holder 4 and the knife 6, which serves as a compensation for the heavier knife wear.

FIGURE 4 shows on an enlarged scale the top view of the square attachment 19 of one of the eccentric screws. A mark 22 provided on the attachment shows clearly the direction of the eccentricity of the eccentric attachment 9, thereby facilitating the setting of the desired knife adjustment.

A section along the line A–B is illustrated in FIGURE 5. The knife beam 1 and the knife holder 4 are braced against one another by means of the threaded bolt 2, thereby securing the upper knife holder 4 after adjustment has been completed against the plane 17 of the upper knife beam 1. Passage holes 23 of the knife holder 4 for the threaded bolts 2 are executed with a diameter larger than the threaded bolt 2, so that with the screws loosened, the knife holder is freely shiftable by means of the eccentric screws. As in the case of the bore 10, the passage holes 23 in the knife holder 4 for the bolts 2 can be provided with oblong openings that are arranged so that their major axes are perpendicular to the knife holder. The bolts 2 have heads 24 that overlap the edges of the passage holes 23 and prevent the threaded bolts from being turned through during their tightening. Also in the zone of the threaded bolts 2 the knife holder, for the absorption of shearing forces, is braced toward the rear through adjusting screws 13 passing through the plate 12. The bolts 2 also have flattened surfaces 25 which come to rest back of the end-plate 26 of the knife holder raised somewhat in the zone of the bolts.

In accordance with the provisions of the patent statutes, we have explained the principle and operation of our invention and have illustrated and described what we consider to represent the best embodiment thereof. However, we desire to have it understood that within the scope of the appended claims, the invention may be practiced otherwise than as specifically illustrated and described.

We claim:

1. In a shear for cutting strip-like material and having two cooperative cutting knives, an apparatus for adjusting one of the knives in a plane perpendicular to the cutting plane of the knives,
   a knife holder for carrying one of said knives,
   said knife holder being carried by a knife beam and being adjustable relative thereto in a direction towards said cutting plane,
   said knife holder and knife beam contacting each other through shearing load-transmitting surfaces,
   releasable connecting means carried by said knife beam and secured to said knife holder for pressing the load-transmitting surfaces forcibly together,
   at least two shafts independent of said releasable connecting means rotatably carried by said knife beam, each having eccentric portions received in bores formed in said knife holder,
   the axes of said eccentric portions being normal to the direction of displacement of said knife holder, whereby on rotation thereof, said knife holder and its knife are moved to the cutting plane.

2. An adjusting device, according to claim 1, wherein at least one of said bores of said knife holder encompasses the eccentric attachment of one of said rotatable shafts and is developed as an oblong hole.

3. An adjusting apparatus, according to claim 1, including a plurality of bolts carried by said knife beam received in a bore formed in said knife holder,
   said bolts having surfaces that engage said knife holder for maintaining said knife holder against said knife beam.

4. An adjusting apparatus, according to claim 1, including pressure screws carried by said knife beam engageable with said knife holder in the direction of said cutting plane.

References Cited by the Examiner

UNITED STATES PATENTS

| | | | |
|---|---|---|---|
| 2,582,522 | 1/1952 | Battersby | 83—700 |
| 3,122,048 | 2/1964 | Warner | 83—700 |

WILLIAM W. DYER, JR., *Primary Examiner.*

L. TAYLOR, *Assistant Examiner.*